(12) United States Patent
Thomas et al.

(10) Patent No.: US 7,591,482 B2
(45) Date of Patent: Sep. 22, 2009

(54) AIR BAG SYSTEM

(75) Inventors: Scott D. Thomas, Novi, MI (US); James M. Kumkoski, Utica, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 368 days.

(21) Appl. No.: 11/356,344

(22) Filed: Feb. 16, 2006

(65) Prior Publication Data
US 2007/0187935 A1    Aug. 16, 2007

(51) Int. Cl.
B60R 21/239    (2006.01)
(52) U.S. Cl. .................................... 280/739; 280/743.2
(58) Field of Classification Search ................ 280/739, 280/743.1, 743.2
See application file for complete search history.

(56) References Cited

U.S. PATENT DOCUMENTS

| | | | | |
|---|---|---|---|---|
| 5,405,166 | A * | 4/1995 | Rogerson | 280/739 |
| 5,887,894 | A * | 3/1999 | Castagner et al. | 280/743.2 |
| 6,076,854 | A * | 6/2000 | Schenck et al. | 280/743.2 |
| 6,082,765 | A | 7/2000 | Bowers et al. | 280/742 |
| 6,290,257 | B1 * | 9/2001 | Bunce et al. | 280/739 |
| 6,390,501 | B1 | 5/2002 | Greib et al. | 280/743.2 |
| 6,454,300 | B1 * | 9/2002 | Dunkle et al. | 280/742 |
| 6,511,094 | B2 | 1/2003 | Thomas et al. | 280/743.2 |
| 6,561,545 | B2 | 5/2003 | Greib et al. | 280/743.2 |
| 6,648,371 | B2 * | 11/2003 | Vendely et al. | 280/739 |
| 6,773,030 | B2 * | 8/2004 | Fischer | 280/739 |
| 6,832,778 | B2 * | 12/2004 | Pinsenschaum et al. | 280/739 |
| 7,264,268 | B2 * | 9/2007 | Ehrke | 280/729 |
| 7,275,763 | B2 * | 10/2007 | Thomas et al. | 280/743.2 |
| 2004/0012180 | A1 * | 1/2004 | Hawthorn et al. | 280/739 |
| 2004/0017069 | A1 * | 1/2004 | Fischer | 280/739 |
| 2004/0051285 | A1 | 3/2004 | Fischer | 280/739 |
| 2004/0051286 | A1 | 3/2004 | Fischer et al. | 280/739 |
| 2004/0232677 | A1 | 11/2004 | Fischer et al. | 280/739 |
| 2005/0040634 | A1 | 2/2005 | Braun et al. | 280/742 |
| 2005/0127648 | A1 | 6/2005 | Fischer et al. | 280/739 |
| 2005/0146122 | A1 | 7/2005 | Gould et al. | 280/739 |
| 2006/0284404 | A1 * | 12/2006 | Green et al. | 280/743.2 |

FOREIGN PATENT DOCUMENTS

| | | |
|---|---|---|
| DE | 19837749 A1 | 3/2000 |
| DE | 10210328 A1 | 10/2002 |
| DE | 10139626 A1 | 3/2003 |
| DE | 10300156 A1 | 8/2003 |
| DE | 102005012614 A1 | 10/2005 |
| EP | 1418093 A1 | 5/2004 |

\* cited by examiner

*Primary Examiner*—Faye M. Fleming
*Assistant Examiner*—Laura Freedman

(57) ABSTRACT

An air bag system includes an inflator, an inflatable air bag, and a vent opener operatively connected to the air bag and selectively movable from a first position to a second position to create a cushion vent within the air bag for venting inflation fluid. A movable member operatively connects to an air bag housing, with a retention member extending through a connector arm to selectively connect the movable member and the vent opener. A sensing tether is operable to selectively release the retention member. The air bag system may further include a switch, with a sensing tether operable to change the state of the switch if any portion of the air bag passes a predetermined plane during inflation thereof.

13 Claims, 6 Drawing Sheets

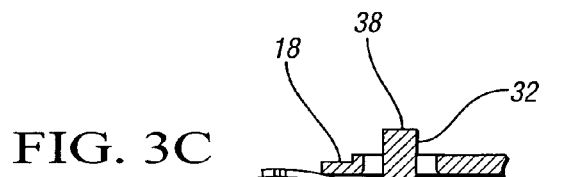
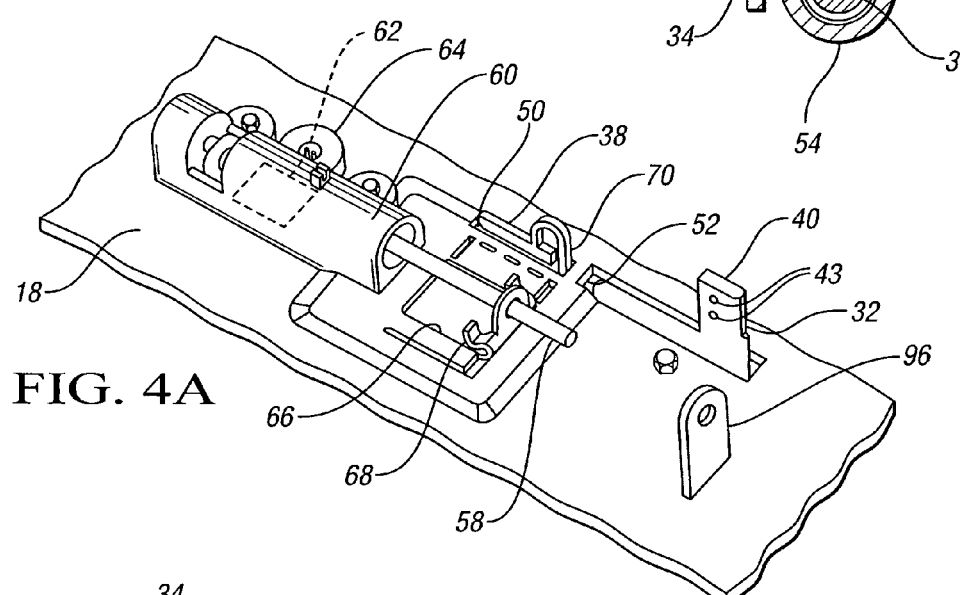
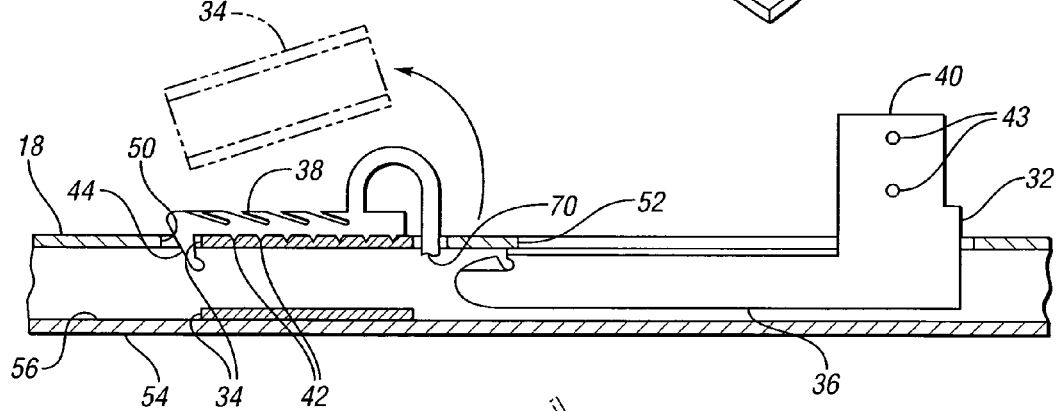
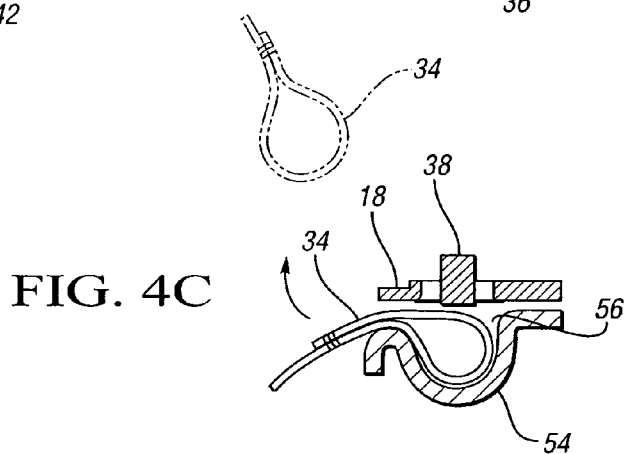

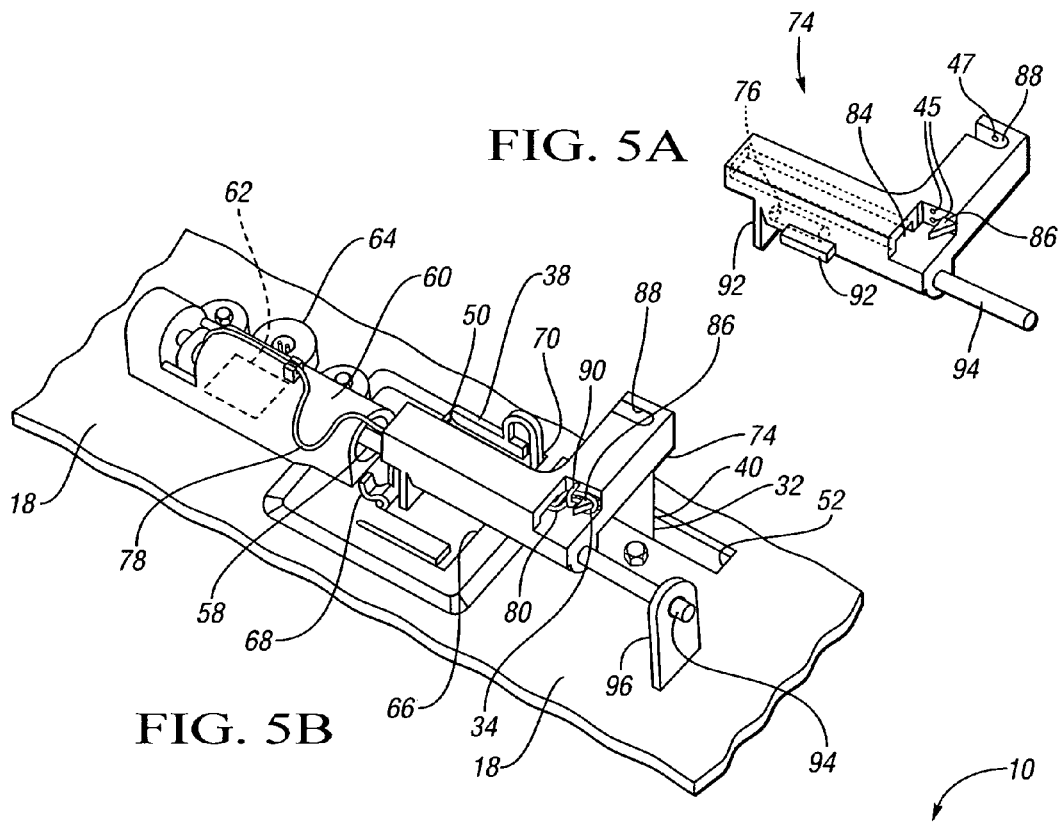
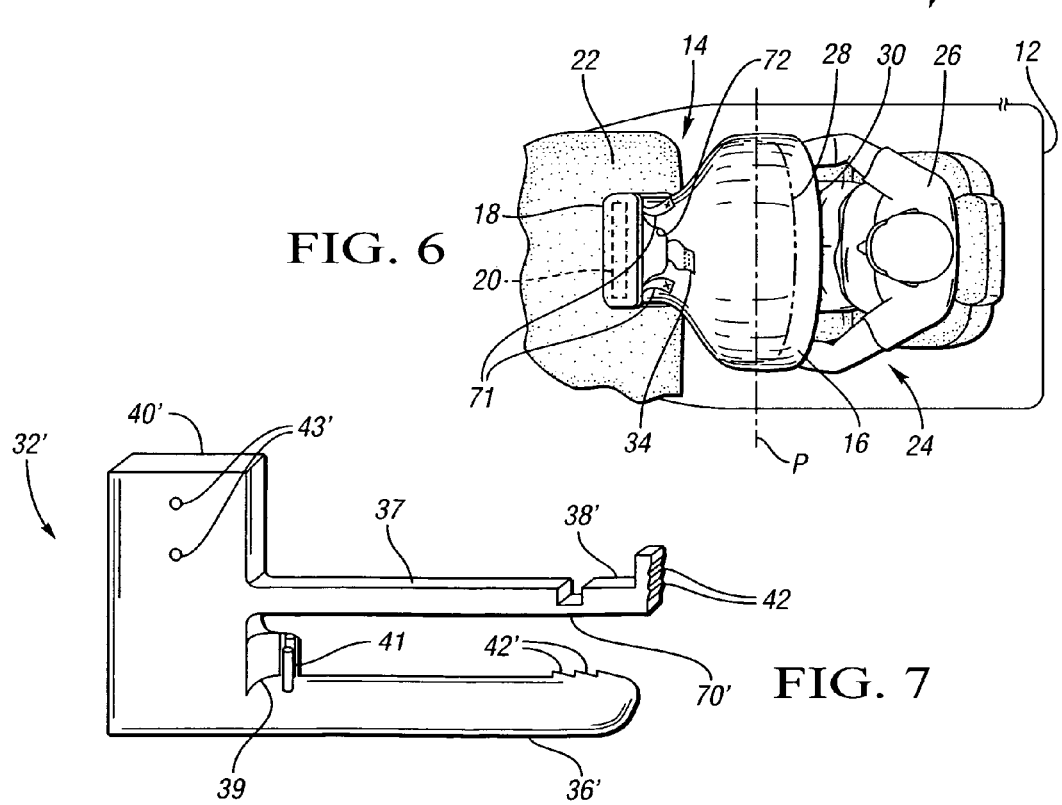

AIR BAG SYSTEM

TECHNICAL FIELD

This invention relates to air bag systems, and more particularly to using a sensing tether attached to an air bag to create a vent within the air bag for dissipation of inflation fluid therein, or to change the state of a switch.

BACKGROUND OF THE INVENTION

Air bag systems in automotive vehicles generally include an air bag that is designed to deploy toward a seat or seating location of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

The present invention provides an air bag system including an inflator operable to release inflation fluid, an inflatable air bag inflatable upon release of inflation fluid by the inflator, and a vent opener operatively connected to the air bag and selectively movable from a first position to a second position to create a cushion vent within the air bag for venting inflation fluid. The vent opener may retain a portion of the air bag when in the first position, such that movement to the second position releases the portion of the air bag. Release of inflation fluid by the inflator builds pressure within the air bag. Preferably, movement of the vent opener to the second position combined with the pressure built up within the air bag creates sufficient force to tear the air bag and create the cushion vent. The air bag may define weakened areas and/or reinforced areas for controlling tearing of the air bag during creation of the cushion vent. The portion of the air bag may be a cushion loop, with the vent opener extending through the cushion loop when in the first position. The vent opener may include a base which extends through the portion of the air bag when the vent opener is in the first position, with the base sliding out from the portion of the air bag as the vent opener moves to the second position to release the portion of the air bag. As an alternative, the vent opener may include a weakened portion, with the vent opener breaking at the weakened portion during movement from the first position to the second position to release the portion of the air bag. As another alternative, the vent opener may include a cutting blade which slices through the portion of the air bag as the vent opener moves from the first position to the second position to release the portion of the air bag. If a cutting blade is used, the vent opener may include a sacrificial protective member which breaks away to expose the portion of the air bag to the cutting blade as the vent opener begins movement from the first position to the second position.

The air bag system may further include an air bag housing substantially surrounding the air bag, with a movable member operatively connected to the housing and at least partially defining a pressurizable chamber. An actuator operable to selectively release actuation fluid into the pressurizable chamber may move the movable member from an undeployed state to a deployed state. A connector arm may selectively connect the movable member and the vent opener, such that movement of the movable member from the undeployed state to the deployed state causes movement of the vent opener from the first position to the second position when the movable member and the vent opener are connected. A retention member may connect the connector arm to either the vent opener or the movable member. A flexible sensing tether may extend between the air bag and the retention member, with the sensing tether operable to selectively release the retention member from the vent opener or the movable member, preferably when the air bag passes a predetermined plane during inflation. The air bag housing may include a channel member defining a channel, with the vent opener retaining the portion of the airbag within the channel when the vent opener is in the first position.

The present invention also provides an air bag system including an inflator operable to release inflation fluid, an inflatable air bag inflatable upon release of inflation fluid by the inflator, and a switch in communication with a vehicle controller at a terminal. The switch is changeable from a first state to a second state, with a sensing tether extending from the air bag operable to change the state of the switch if the sensing tether becomes sufficiently extended. Preferably, the sensing tether is sufficiently extended when any portion of the air bag passes a predetermined plane during inflation. The switch may include a switch retention member in contact with the terminal when the switch is in the first state. The sensing tether would thus be operable to pull the switch retention member out of contact with the terminal to change the switch to the second state when any portion of the air bag passes the predetermined plane during inflation. Alternatively, the switch may include a notch, with the sensing tether breaking the switch at the notch to break the terminal, thereby changing the switch to the second state, when any portion of the air bag passes the predetermined plane during inflation. The sensing tether may include a switch interface loop attached to the switch when the switch is in the first state, with the switch interface loop detaching from the switch as the switch changes to the second state.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3C is a schematic partially cross-sectional end view of the vent opener of FIG. 3A;

FIG. 4A is a schematic perspective view of the vent opener of FIG. 2 extending upward through the air bag housing in a second position;

FIG. 4B is a schematic partially cross-sectional side view of the vent opener of FIG. 4A;

FIG. 4C is a schematic partially cross-sectional end view of the vent opener of FIG. 4A;

FIG. 5A is a schematic perspective view of a connector arm for selectively connecting the vent opener of FIG. 2 with a piston;

FIG. 5B is a schematic perspective view of the connector arm of FIG. 5A attached between the vent opener and the piston;

FIG. 6 is a schematic plan view of the air bag system of FIG. 1, showing a cushion vent created within the air bag;

FIG. 7 is a schematic perspective view of a second embodiment of a vent opener;

DESCRIPTION OF THE PREFERRED EMBODIMENTS

Figure 1:
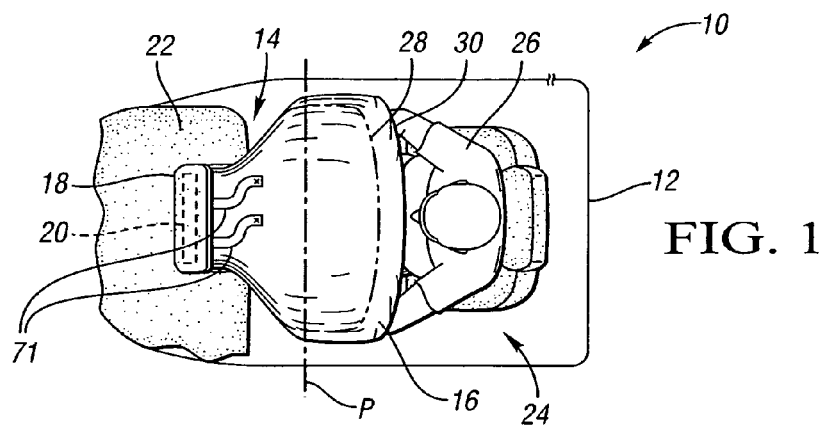
FIG. 1 is a schematic plan view of an air bag system mounted to a vehicle.

Referring to the drawings, wherein like reference numbers refer to like components, FIG. 1 shows a vehicle 10 having a vehicle body 12. An air bag system 14 is mounted to the vehicle 10. The air bag system 14 includes an air bag 16 initially housed within an air bag housing 18. An inflator 20 is mounted to the housing 18. The housing 18 is mounted within an instrument panel 22, although it may be mounted elsewhere on the vehicle 10 within the scope of the invention. The air bag 16 is selectively deployable into an interior space 24 toward an occupant 26 upon release of inflation gas by the inflator 20. The air bag 16 is inflatable when deployed to either a shallow first profile 28 or a deeper second profile 30. Sensors (not shown) mounted to the vehicle 10 may be connected in signaling communication with the inflator 20, as known to those skilled in the art. Under certain sensed conditions, the sensors signal the inflator 20 to release inflation fluid, thereby inflating the air bag 16.

A predetermined plane P is shown in FIG. 1. The purpose of the predetermined plane P will become more apparent below. The predetermined plane P may be chosen anywhere within the vehicle interior space 24 between the air bag housing 18 and the first profile 28. For ease of explanation, each reference to the "predetermined plane of FIG. 1" and "the predetermined plane" used herein refers to the predetermined plane P shown in FIG. 1.

Figure 2:
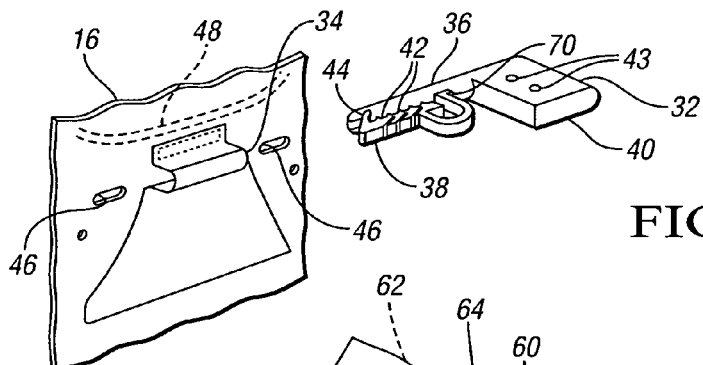
FIG. 2 is a schematic perspective view of a first embodiment of a vent opener extending through a portion of an air bag of the air bag system of FIG. 1.

Referring now to FIG. 2, a vent opener 32 is configured to extend through a cushion loop 34 in the air bag 16. Specifically, the vent opener 32 includes a base 36, a retention feature 38, and an attachment portion 40. During assembly, the base 36 is inserted through the cushion loop 34 such that the cushion loop 34 rests between the base 36 and the retention feature 38. The retention feature 38 may include teeth 42 and/or a flange 44 for retaining the cushion loop 34. As shown in FIG. 2, the air bag 16 may include weakened areas such as openings 46, and/or reinforced areas 48, the purpose of which will be described herein. The weakened areas 46 could also be tear stitching that unzips or breaks at a low force level, or any other type of weakened area. The vent opener 32 defines a pair of openings 43, the purpose of which will also be described below.

Figure 3A:
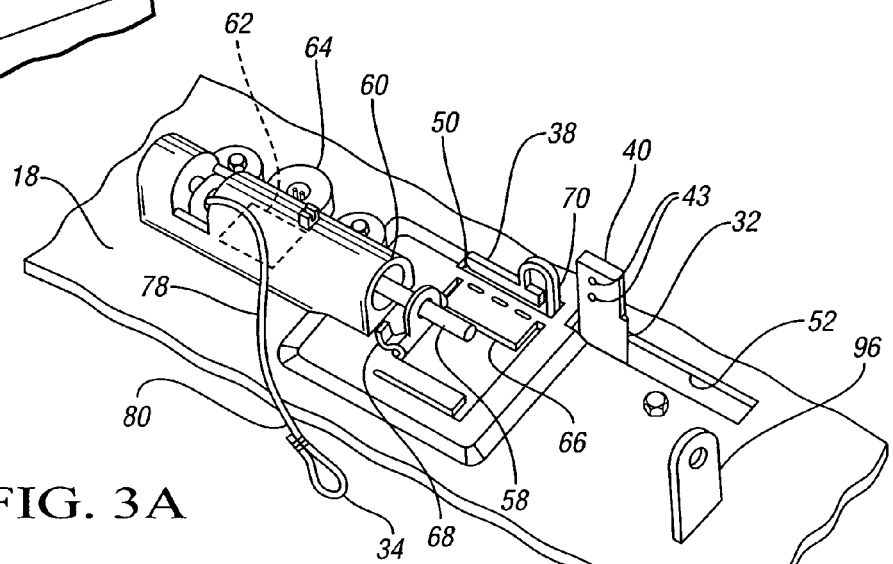
FIG. 3A is a schematic perspective view of the vent opener of FIG. 2 extending upward through an air bag housing in a first position.

FIG. 3A shows a portion of an exterior of the air bag housing 18. As shown in FIG. 3A, the vent opener 32 preferably seats within the air bag housing 18 and extends upward therethrough. In particular, the air bag housing 18 defines first and second slots 50, 52, with the retention feature 38 extending upward through the first slot 50, and the attachment portion 40 extending upward through the second slot 52. However, within the scope of the present invention, the vent opener 32 could be disposed outside of or inside of the air bag housing 18. For example, the cushion loop 34 could be routed through an opening (not shown) within the air bag housing 18, with the vent opener 32 extending through the cushion loop 34 outside of the air bag housing 18.

Figure 3B:
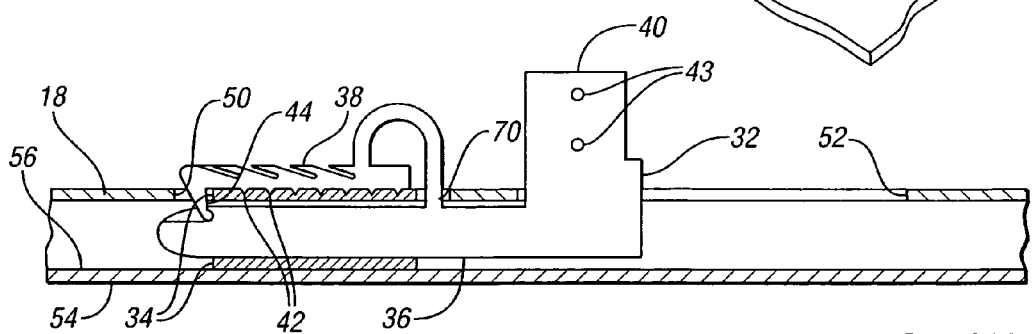
FIG. 3B is a schematic partially cross-sectional side view of the vent opener of FIG. 3A.

Turning to FIGS. 3B and 3C, the air bag housing 18 may include a channel member 54 defining a channel 56, with the cushion loop 34 seated within the channel 56. The channel member 54 may be integral with the air bag housing 18, or it may be attached by other mechanical means. As another alternative, the channel member 54 may be a portion of a cushion retainer upon which the air bag 16 is mounted. The channel member 54 helps to retain the cushion loop 34 between the base 36 and the retention feature 38 of the vent opener 32. FIG. 3B shows a cross-sectional side view of the channel 56 with the vent opener 32 therein, while FIG. 3C shows a cross-sectional end view of the channel 56, giving a different view of the cushion loop 34. While the channel member 54 is shown inside the air bag housing 18 in the Figures, the channel member 54 may also be disposed outside of the airbag housing 18 without changing the inventive concept.

Referring back to FIG. 3A, a piston 58 slidable within a piston housing 60 attaches to the air bag housing 18. The piston 58 is movable from an undeployed state, as shown in FIG. 3A, to a deployed state, as shown in FIG. 4A. In the preferred embodiment, the piston 58 and the piston housing 60 define a pressurizable chamber 62 into which an actuator 64 extends. The actuator 64 releases actuation fluid into the pressurizable chamber 62 upon detection of sensed conditions. One such actuator 64 is a pyrotechnic device, such as a container of solid propellant, wherein the propellant is conventionally ignited by an electric signal, such as a signal from an electronic controller, to actuate the actuator 64. Upon actuation, pressure builds within the pressurizable chamber 62 to move the piston 58 from the undeployed state to the deployed state. The conditions causing the electronic controller to deploy the actuator 64 may include impact speed, weight of the occupant, sensed seat or occupant position, seatbelt usage etc. Each of these conditions may be determined with sensors in signaling communication with the actuator 64 and electronic controller.

The air bag housing 18 includes a vent 66 for allowing inflation fluid from the inflator 20 to pass into the surrounding atmosphere from inside the air bag housing 18. The piston 58 may attach to a vent blocker 68 for selectively covering the vent 66 upon movement from the undeployed state to the deployed state. The vent opener 32 is movable from a first position, shown in FIGS. 3A through 3C, to a second position, shown in FIGS. 4A through 4C during deployment of the air bag 16 as described below. The retention feature 38 of the vent opener 32 preferably includes a weakened portion 70. As the vent opener 32 moves from the first position to the second position, the base 36 slides within the channel 56, with the attachment portion 40 sliding along the second slot 52 within the air bag housing 18. Additionally, the retention feature 38 breaks free from the base 36 at the weakened portion 70, allowing the base 36 to slide out from the cushion loop 34. The teeth 42 of the retention feature 38 may assist in removal of the cushion loop 34 from the base 36 by holding the cushion loop 34 stationary as the base 36 travels to the second position. Preferably, airbag housing 18 overlaps the retention feature 38 such that the retention feature 38 remains pressed against the cushion loop 34 after the weakened portion 70 breaks as the base 36 slides out of the cushion loop 34. Once the cushion loop 34 is free, gas pressure built up inside the air bag 16 during deployment pulls the cushion loop 34 out of the channel 56, as shown in phantom in FIGS. 4B and 4C, with a force preferably causing the air bag 16 to tear at the openings 46 shown in FIG. 2. The reinforced areas 48 of the air bag 16 shown in FIG. 2 help to control the amount of tearing. Additionally, supporting tethers 71 (shown best in FIGS. 1 and 6) extend from the air bag 16 to help control the amount of tearing. Thus, when the vent opener 32 is allowed to move to the second position, the cushion loop 34 is freed, and the gas pressure built up inside the air bag 16 during deployment pulls the cushion loop 34 from the channel 56 with enough force to open a cushion vent 72 within the air bag 16, or between the air bag 16 and the airbag housing 18, as shown in FIG. 6. The cushion vent 72 allows inflation fluid from the inflator 20 to pass into the surrounding atmosphere, resulting in less aggressive deployment of the air bag 16.

The vent opener 32 is preferably movable from the first position to the second position in response to movement of the piston 58 from the undeployed state to the deployed state. Turning now to FIGS. 5A and 5B, a connector arm 74 is shown for selectively connecting the piston 58 to the vent opener 32. Preferably, the piston 58 is press fit into a piston opening 76 defined by the connector arm 74. However, a separate fastener may be used, or the connector arm 74 may be integral with the piston 58. Additionally, the connector arm 74 may be integral with or attach directly to the vent opener 32 and selectively attach to the piston 58. It matters only that the connector arm 74 facilitates the connection of the piston 58 and the vent opener 32 when necessary.

FIG. 5B shows the connector arm 74 connected between the piston 58 and the vent opener 32. A sensing tether 78 extends from within the air bag housing 18. As shown in FIGS. 1 and 3A, the sensing tether 78 preferably includes a proximal portion 80 and a distal portion (not shown), with the distal portion attached to an inner face of the air bag 16. The connector arm 74 includes a passageway 84 (shown best in FIG. 5A) through which the proximal portion 80 of the sensing tether 78 is routed. The connector arm 74 preferably includes a surface 85 and a ramp 86, with the proximal portion 80 of the sensing tether 78 looped around the ramp 86. The connector arm 74 defines a cavity 88 for receiving the attachment portion 40 of the vent opener 32, and defines first and second pairs of openings 45, 47 (only one of the second pair of openings 47 is shown). A retention member 90 selectively extends over the sensing tether 78, through the first pair of openings 45 in connector arm 74, through the pair of openings 43 in the attachment portion 40, and through the second pair of openings 47 in the connector arm. When the retention member 90 is seated through the openings 43, 45, 47, the piston 58 and the vent opener 32 are connected such that movement of the piston 58 causes movement of the vent opener 32.

Prior to inflation of the air bag 16, the sensing tether 78 is substantially slack. As the air bag 16 inflates, the sensing tether 78, having the distal portion attached to an inner face of the air bag 16, is pulled taut to reduce the slack therein. If any portion of the air bag 16 passes the predetermined plane P of FIG. 1 during inflation thereof, the proximal portion 80 of the sensing tether 78 is pulled off of the ramp 86 (of FIG. 5A), thereby pulling the retention member 90 out of the attachment portion 40 of the vent opener 32. After the retention member 90 is released, the connector arm 74 is disconnected from the vent opener 32, and therefore the piston 58 is also disconnected from the vent opener 32. When the piston 58 and the vent opener 32 are not connected, movement of the piston 58 from the undeployed state to the deployed state will not move the vent opener 32 from the first position. Therefore, the cushion vent 72 (shown in FIG. 6) will not be opened if the distal portion of the sensing tether 78 passes the predetermined plane P of FIG. 1 during inflation of the air bag 16. If the air bag 16 does not pass the predetermined plane P, the retention member 90 will not be pulled from the vent opener 32. Instead, the retention member 90 will keep the piston 58 and the vent opener 32 attached, such that movement of the piston 58 will effect movement of the vent opener 32 to create the cushion vent 72 shown in FIG. 6. Thus, the predetermined plane P is defined as the plane the air bag 16 must pass during inflation to avoid opening the cushion vent 72.

Returning briefly to FIGS. 5A and 5B, the connector arm 74 may include stabilizing flanges 92 to prevent inflation fluid from rotating or otherwise moving the connector arm 74. Additionally, the connector arm 74 may also include a stabilizing rod 94. The stabilizing rod 94 passes through a flange 96 extending from the air bag housing 18 to prevent inflation fluid from placing a moment or torque on the connector arm 74. Alternatively, the stabilizing rod 94 could be an extension off of the piston 58.

Turning now to FIGS. 7-9B, a second embodiment of the present invention is shown. FIG. 7 shows a vent opener 32' configured to extend through a cushion loop 34' (shown in FIGS. 8B, 8C, 9A and 9B). The vent opener 32' includes a base 36', a retention feature 38', and an attachment portion 40', and defines a pair of openings 43'. The retention feature 38' connects to a support member 37 extending from the attachment portion 40' via a weakened portion 70', preferably comprising a living hinge. The retention portion 38' is bendable at the living hinge 70' to contact the base 36', thereby retaining the cushion loop 34' between the support member 37 and the base 36'. The retention feature 38' and the base 36' may include teeth 42' to improve contact therebetween. In addition, the vent opener 32' includes a cutting member 39, with the cushion loop 34' preferably disposed between the cutting member 39 and the retention feature 38'. As shown in FIG. 8B, the vent opener 32' preferably seats within an air bag housing 18', extending upward through a first slot 50' therein. However, the vent opener 32' could be disposed outside of or inside of the air bag housing 18' without changing the present invention. As shown in FIGS. 8B and 8C, the air bag housing 18' may include a channel member 54' defining a channel 56', with the cushion loop 34' seated within the channel 56'. FIG. 8B shows a cross-sectional side view of the channel 56' with the vent opener 32' therein, while FIG. 8C shows a cross-sectional end view of the channel 56'.

Figure 8A:
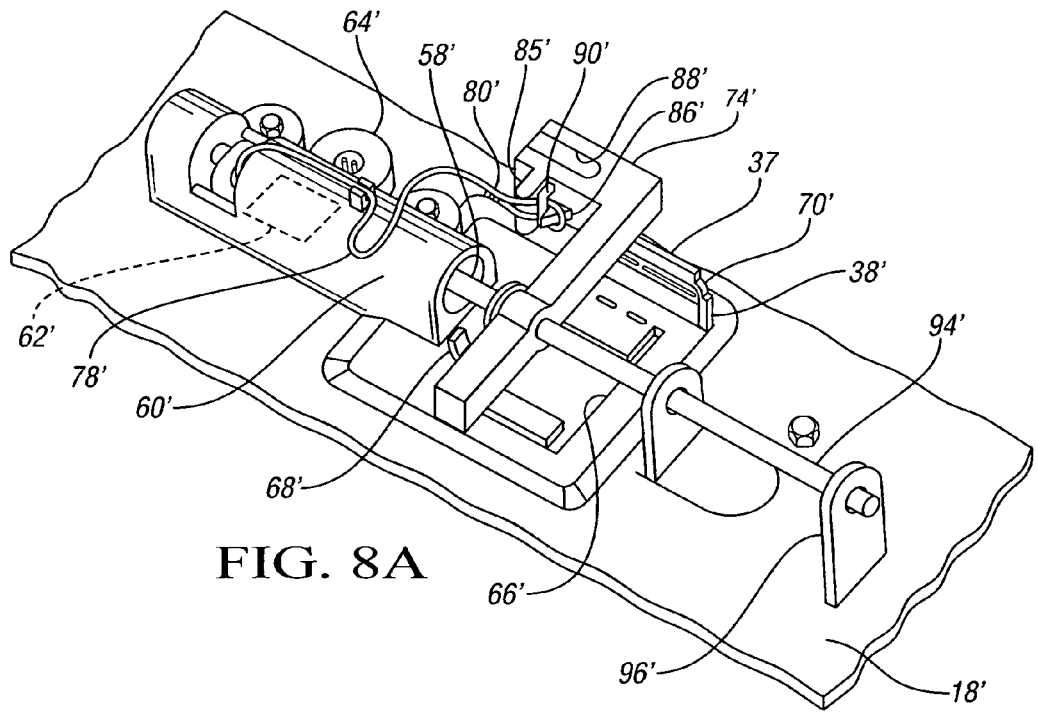
FIG. 8A is a schematic perspective view of the vent opener of FIG. 7 extending upward through an air bag housing in a first position, with a second embodiment of a connector arm selectively connecting the vent opener with a piston.

Referring to FIG. 8A, a piston 58' slidable within a piston housing 60' attaches to the air bag housing 18'. The piston 58' is movable from an undeployed state, as shown in FIG. 8A, to a deployed state (not shown) as described with reference to the first embodiment above. Preferably, the piston 58' and the piston housing 60' define a pressurizable chamber 62' into which an actuator 64' extends. The actuator 64' releases actuation fluid into the pressurizable chamber 62' upon detection of sensed conditions. The piston 58' may attach to a vent blocker 68' for selectively covering a vent 66' within the air bag housing 18' upon movement from the undeployed state to the deployed state.

Figure 8B:
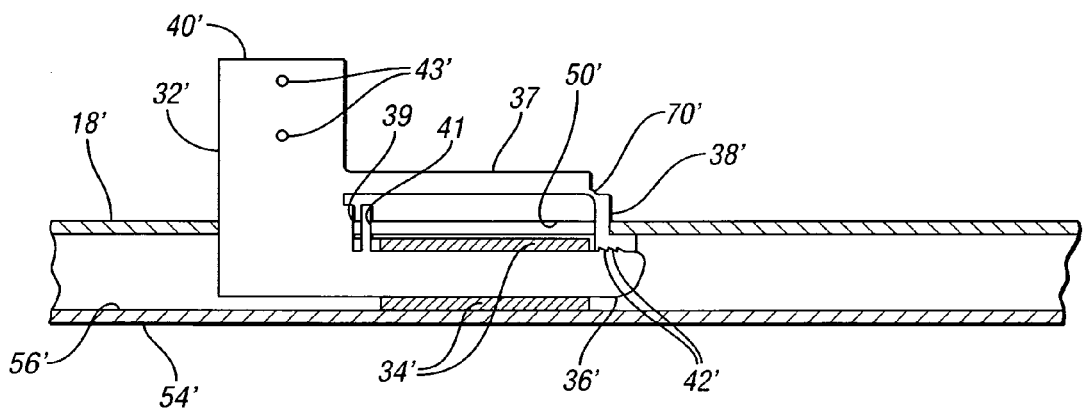
FIG. 8B is a schematic partially cross-sectional side view of the vent opener of FIG. 8A.
Figure 8C:
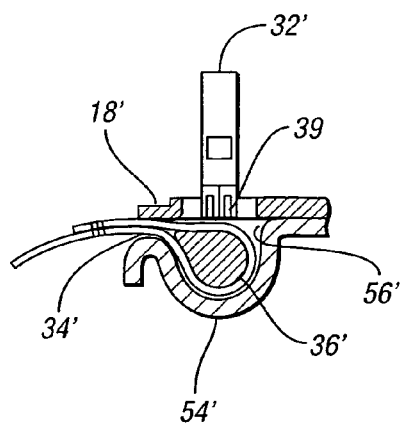
FIG. 8C is a schematic partially cross-sectional end view of the vent opener of FIG. 8A.
Figure 9A:
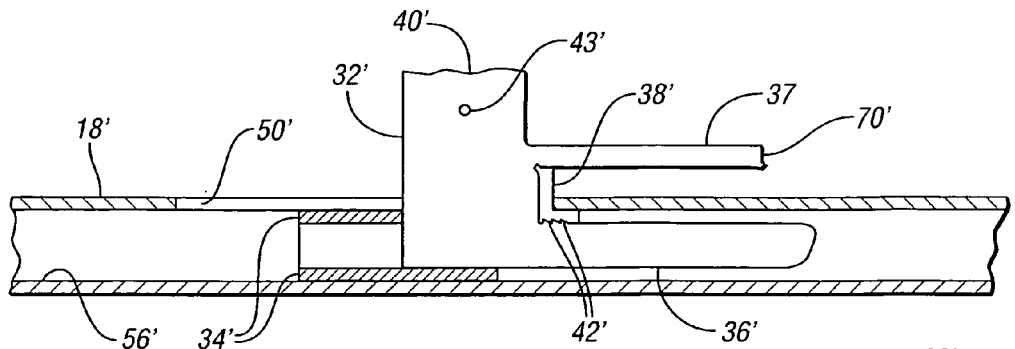
FIG. 9A is a schematic partially cross-sectional side view of the vent opener of FIG. 7, with the vent opener shown in a second position.
Figure 9B:
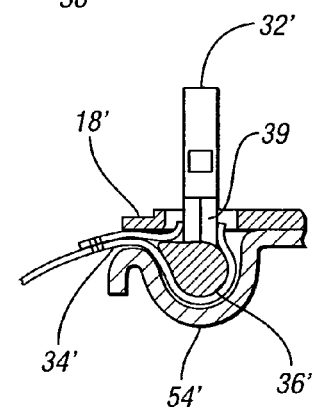
FIG. 9B is a schematic partially cross-sectional side view of the vent opener of FIG. 9A.

The vent opener 32' is also movable from a first position, shown in FIGS. 8A through 8C, to a second position, as shown in FIGS. 9A and 9B. As the vent opener 32' moves from the first position to the second position, the base 36' slides within the channel 56' while the attachment portion 40' slides along the first slot 50'. Additionally, the retention feature 38' breaks free from the vent opener 32' at the weakened portion 70'. As the base 36' slides along the channel 56', the cutting member 39 passes through the cushion loop 34', thereby cutting the cushion loop 34' as shown in FIGS. 9A and 9B. Since the cushion loop 34' is disposed between the retention feature 38' and the cutting member 39, the retention member 38', being detached from the vent opener 32', holds the cushion loop 34' in position, thereby ensuring the cutting member 39 cuts therethrough. The cutting member 39 can have one blade or a plurality of blades in any different configuration. It matters only that movement of the vent opener 32' from the first position to the second position allows the cutting member 39 to slice through the cushion loop 34'. A protective member 41 preferably extends from the base 36' of the vent opener 32' to prevent the cushion loop 34' from contacting the cutting member 39 prior to movement of the vent opener 32'. The protective member 41 is sacrificial, and breaks away from the base 36' as the base begins travel within the channel 56'.

Once the cushion loop 34' has been cut, gas pressure built up inside the air bag 16 during deployment pulls the cushion loop 34' from the channel 56' with a force causing the air bag 16 to tear at the openings 46 shown in FIG. 2. The reinforced areas 48 of the air bag 16 shown in FIG. 2 help to control the amount of tearing. Thus, when the vent opener 32' is allowed to move to the second position, the cushion loop 34' is sliced free, and the gas pressure built up inside the air bag 16 during deployment pulls the cushion loop 34' from the channel 56' with enough force to open a cushion vent 72 within the air bag 16, as shown in FIG. 6. The cushion vent 72 allows inflation fluid from the inflator to pass into the surrounding atmosphere, resulting in less aggressive deployment of the air bag 16.

The vent opener 32' is preferably movable from the first position to the second position in response to movement of the piston 58' from the undeployed state to the deployed state. Turning back to FIG. 8A, a connector arm 74' is shown for selectively connecting the piston 58' to the vent opener 32'. Preferably, the piston 58' is press fit into the connector arm 74'. The connector arm 74' may include a stabilizing rod 94' passing through a flange 96' extending from the air bag housing 18'. A sensing tether 78' extends from within the air bag housing 18'. The sensing tether 78' preferably includes a proximal portion 80' and a distal portion (not shown), with the distal portion attached to an inner face of the air bag 16. The connector arm preferably includes surface 85' and a ramp 86', with the proximal portion 80' of the sensing tether 78' looped around the ramp 86'. The connector arm 74' defines a cavity 88' for receiving the attachment portion 40' of the vent opener 32'. A retention member 90' selectively extends over the sensing tether 78', through a first pair of openings (not shown) defined by the connector arm 74', through the pair of openings 43' in the vent opener 32', and through a second pair of openings (not shown) defined by the connector arm 74', thereby connecting the piston 58' and the vent opener 32' such that movement of the piston 58' causes movement of the vent opener 32'.

Prior to inflation of the air bag 16, the sensing tether 78' is substantially slack. As the air bag 16 inflates, the sensing tether 78', having the distal portion attached to an inner face of the air bag 16, is pulled taut to reduce the slack therein. If any portion of the air bag 16 passes the predetermined plane P of FIG. 1 during inflation thereof, the proximal portion 80' of the sensing tether 78' is pulled off of the ramp 86', thereby pulling the retention member 90' out of the attachment portion 40' of the vent opener 32'. After the retention member 90' is released, the connector arm 74' is disconnected from the vent opener 32', and therefore the piston 58' is also disconnected from the vent opener 32'. When the piston 58' and the vent opener 32' are not connected, movement of the piston 58' from the undeployed state to the deployed state will not move the vent opener 32' from the first position. Therefore, the cushion vent 72 (shown in FIG. 6) will not be opened if the air bag 16 passes the predetermined plane P of FIG. 1 during inflation thereof. If the air bag 16 does not pass the predetermined plane P, the retention member 90' will keep the piston 58' and the vent opener 32' attached, such that movement of the piston 58' will effect movement of the vent opener 32' to create the cushion vent 72 shown in FIG. 6.

Figure 10A:
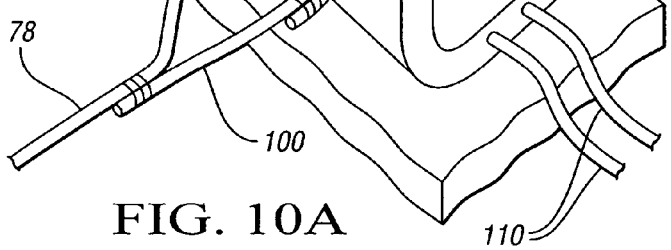
FIG. 10A is a schematic perspective view of a first embodiment of a switch for use with the air bag system of FIG. 1.
Figure 10B:
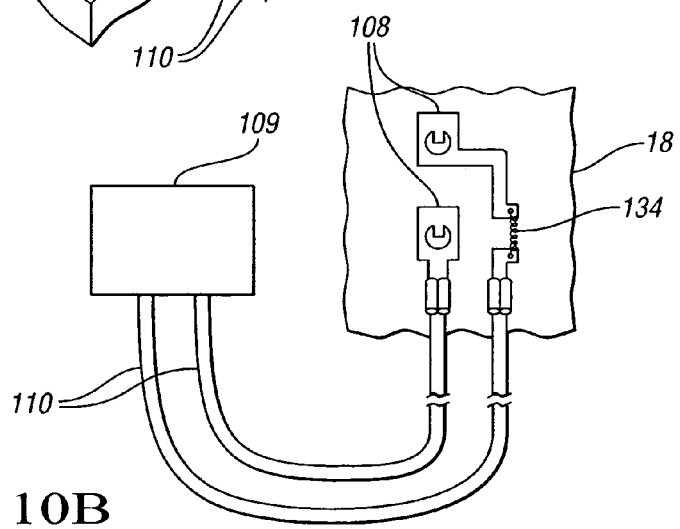
FIG. 10B is a schematic plan view of terminals of the switch of FIG. 10A attached to an air bag housing.

The present invention further provides a switch 98 movable from a first state to a second state if any portion of the air bag 16 passes the predetermined plane of FIG. 1 during inflation of the air bag 16. FIGS. 10A and 10B show a first embodiment of a switch 98, preferably attached to the air bag housing 18. The switch 98 may be disposed anywhere within the air bag system 14, with a secondary sensing tether 100 activating the switch as described herein. The secondary sensing tether 100 may be connected to the sensing tether 78, or it may be connected to an inner face of the air bag 16. In the first embodiment of the switch 98, the secondary sensing tether 100 extends from the sensing tether 78 and routes over a guide 102, with a switch interface loop 101 looping over a ramp 104. A U-shaped switch retention member 106 extends through the switch 98, and retains the secondary sensing tether 100. In the first state, each prong of the switch retention member 106 contacts a terminal 108, shown in FIG. 10B, disposed either on the air bag housing 18 or molded directly into the switch 98, thereby completing a circuit and indicating to a vehicle controller 109 that the air bag 16 has not passed the predetermined plane P. The terminals 108 may be constructed in any manner known in the art. For instance, FIG. 10B shows a resistor 134 as part of one of the terminals. The terminals could also snap into the switch 98 instead of being located on the air bag housing 18, thereby necessitating a two-piece switch design. Two wires 110, shown extending from the switch in FIG. 10A, attach to terminals 108 as shown in FIG. 10B and communicate with the vehicle controller 109. Preferably, the switch retention member 106 and the terminals 108 are made from a conductive material as known in the art. For example, each may be gold-plated.

As the air bag 16 inflates, if any portion of the air bag 16 passes the predetermined plane P, the switch interface loop 101 on the secondary sensing tether 100 travels over the ramp 104 and pulls the switch retention member 106 from the guide 102, thereby breaking the connection between the switch retention member 106 and the terminals 108 and causing the switch 98 to change to the second state. In this manner, only the low mass and flexible switch interface loop 101 remains attached to the secondary sensing tether 100 once the switch 98 changes state. The first embodiment of the switch 98 may also be disposed proximal to the connector arm 74, with the retention member 90 contacting the terminals 108 and the sensing tether 78 operable to pull the retention member 90 out of contact with the terminals. In this case, there would be no need for a secondary sensing tether 100 or a switch retention member 106.

Figure 11A:
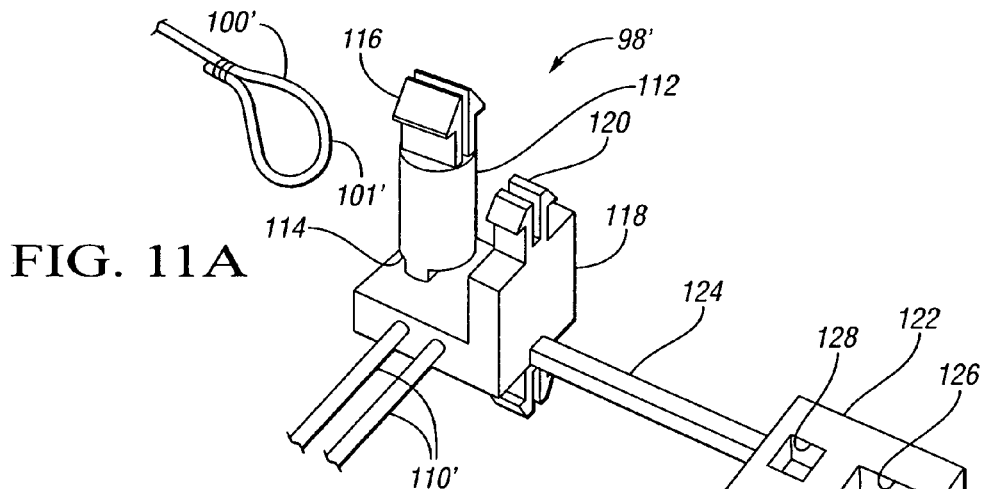
FIG. 11A is a schematic perspective view of a second embodiment of a switch for use with the air bag system of FIG. 1.
Figure 11B:
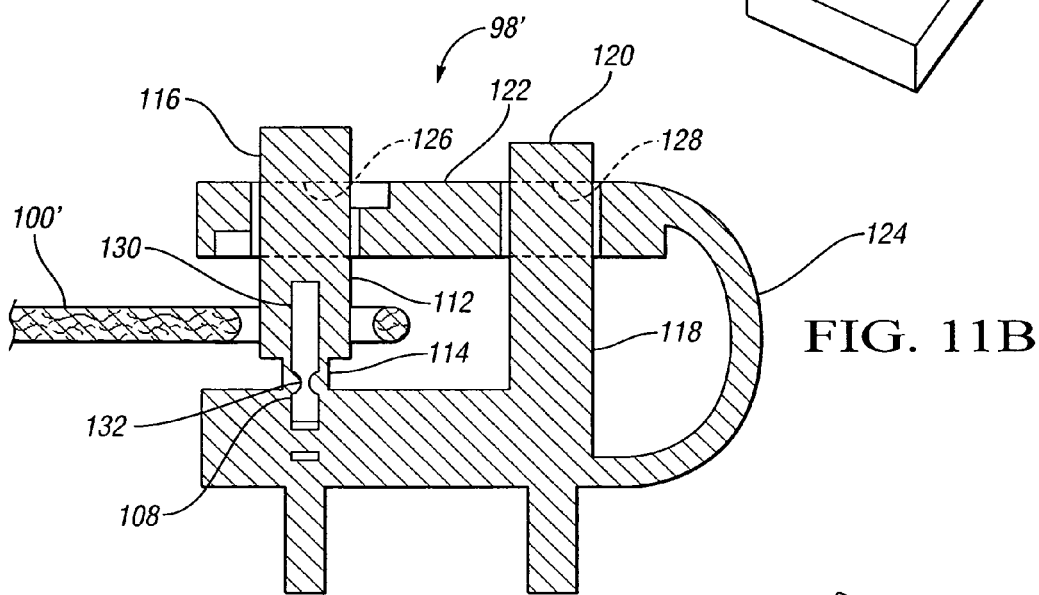
FIG. 11B is a schematic partially cross-sectional view of the switch of FIG. 11A.
Figure 11C:
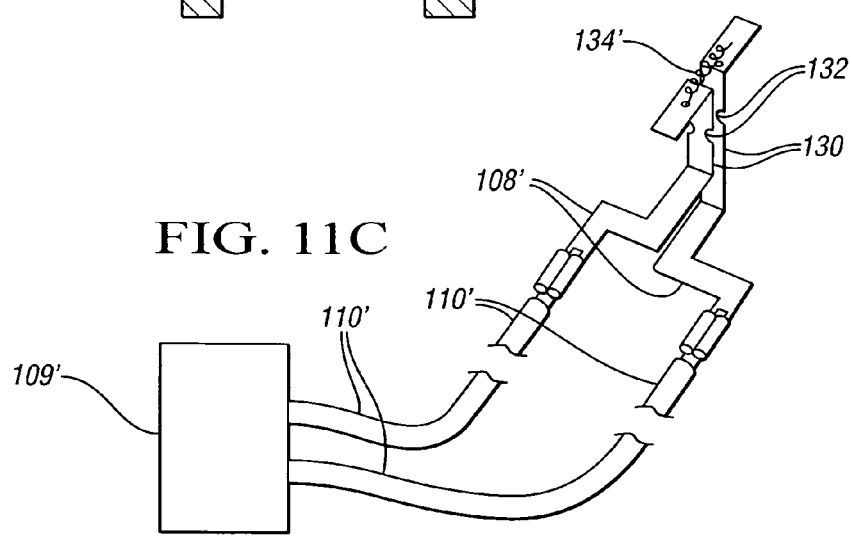
FIG. 11C is a schematic plan view of terminals of the switch of FIG. 11A.

FIGS. 11A through 11C show a second embodiment of a switch 98' for use with the present invention. The switch 98' preferably attaches to the air bag housing 18. The switch 98' includes a column 112 defining a notch 114 and a first locking feature 116, and an extension 118 with a second locking feature 120. A locking plate 122 preferably attaches to the switch 98' via a living hinge 124, and includes first and second locking slots 126, 128. A secondary sensing tether 100' (or, optionally, the sensing tether 78) includes a switch interface loop 101' that routes over the column 112. The locking plate 122 is then rotated at the living hinge 124, and snapped over the switch 98 to the position shown in FIG. 11B, such that the first locking feature 116 snaps into the first locking slot 126 and the second locking feature 120 snaps into the second locking slot 128. Two wires 110' attach to terminals 108', shown in FIG. 11C, and communicate with a vehicle controller 109'. The terminals 108' include extensions 130 having weakened portions 132 which extend upward into the column 112. A resistor 134' may be soldered between the terminals 108', the terminals 108' can be directly connected with an integral piece (not shown), or the terminals 108' may be connected in any way known by one skilled in the art. During inflation of the air bag 16, if any portion of the air bag 16 passes the predetermined plane P, the switch interface loop 101' on the secondary sensing tether 100' breaks the column 112 at the notch 114, thereby also breaking the terminals 108' at the weakened portions 132 to break the circuit, thus changing the state of the switch 98'. In this manner, only the low mass and flexible switch interface loop 101' remains attached to the secondary sensing tether 100' once the switch 98' changes state.

The switch 98 may be configured in any way known in the art. The present invention encompasses including a switch 98 within an air bag system 14 to indicate to a vehicle controller that the air bag 16 has passed the predetermined plane P. If the air bag 16 does not pass the predetermined plane P within a certain amount of time (i.e., 10 to 20 milliseconds), the vehicle controller will then preferably activate the actuator 64 to move the piston 58 to the deployed state, thereby moving the vent opener 32 from the first position to the second position to open a cushion vent 72 within the air bag 16. Alternatively, the inflator 20 output could be modified such as by changing the deployment time of a second stage of the inflator 20 if the air bag 16 does not pass the predetermined plane P within a certain amount of time.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An air bag system comprising:
   an inflator operable to release inflation fluid;
   an inflatable air bag inflatable upon release of inflation fluid from said inflator;
   a vent opener operatively connected to said air bag and selectively movable from a first position to a second position to thereby tear said inflatable air bag and create a cushion vent within said air bag for venting inflation fluid;
   an air bag housing substantially surrounding said air bag;
   a movable member operatively connected to said housing and at least partially defining a pressurizable chamber;
   an actuator operable to selectively release actuation fluid into said pressurizable chamber, thereby pressurizing said pressurizable chamber to move said movable member from an undeployed state to a deployed state;
   a connector arm selectively connecting said movable member and said vent opener;
   wherein movement of said movable member from said undeployed state to said deployed state causes movement of said vent opener from said first position to said second position when said movable member and said vent opener are connected;
   a retention member operable to connect said connector arm to one of said vent opener and said movable member; and
   a flexible sensing tether extending between said air bag and said retention member, said sensing tether operable to release said retention member, thereby disconnecting said connector arm from said one of said vent opener and said movable member.

2. The air bag system of claim 1, wherein said vent opener retains a portion of said air bag when in said first position, and wherein movement to said second position releases said portion of said air bag.

3. The air bag system of claim 2, wherein release of inflation fluid by said inflator builds pressure within said air bag, and wherein movement of said vent opener to said second position combined with said pressure creates sufficient force to tear said air bag, thereby creating said cushion vent.

4. The air bag system of claim 2, wherein said air bag defines at least one of weakened areas, reinforced areas, and control tethers for controlling tearing of said air bag during creation of said cushion vent.

5. The air bag system of claim 2, wherein said portion of said air bag is a cushion loop, with said vent opener extending through said cushion loop when in said first position.

6. The air bag system of claim 2, wherein said vent opener includes a weakened portion such that said vent opener breaks at said weakened portion during movement from said first position to said second position, thereby releasing said portion of said air bag.

7. The air bag system of claim 2, wherein said vent opener includes a base extending through said portion of said air bag when said vent opener is in said first position, said base sliding out from said portion of said air bag as said vent opener moves from said first position to said second position, thereby releasing said portion of said air bag.

8. The air bag system of claim 2, wherein said vent opener includes a cutting blade, and wherein said cutting blade slices through said portion of said air bag as said vent opener moves from said first position to said second position, thereby releasing said portion of said air bag.

9. The air bag system of claim 8, wherein said vent opener further includes a sacrificial protective member which breaks away to expose said portion of said air bag to said cutting blade as said vent opener begins movement from said first position to said second position.

10. The air bag system of claim 1, wherein said sensing tether releases said retention member when said air bag passes a pre-determined plane during inflation thereof.

11. The air bag system of claim 1, wherein said air bag housing includes a channel member defining a channel, and wherein said vent opener retains a portion of said airbag within said channel when in said first position.

12. An air bag system comprising:

an inflator operable to release inflation fluid;

an inflatable air bag inflatable upon release of inflation fluid from said inflator;

an air bag housing substantially surrounding said air bag;

a vent opener operatively connected to said air bag and selectively movable from a first position to a second position to create a cushion vent within said air bag for venting inflation fluid;

a movable member operatively connected to said housing and movable from an undeployed state to a deployed state;

a connector arm selectively connecting said movable member and said vent opener;

a retention member operable to selectively connect said connector arm to one of said vent opener and said movable member; and a flexible sensing tether extending between said air bag and said retention member, said sensing tether operable to release said retention member to disconnect said connector arm from said one of said vent opener and said movable member, thereby disconnecting said movable member and said vent opener;

wherein movement of said movable member from said undeployed state to said deployed state causes movement of said vent opener from said first position to said second position when said movable member and said vent opener are connected.

13. The air bag system of claim 12, wherein said air bag housing includes a channel member defining a channel and said air bag includes a cushion loop, and wherein said vent opener retains said cushion loop within said channel when in said first position.

\* \* \* \* \*